United States Patent
Baweja

(12) 
(10) Patent No.: US 6,260,149 B1
(45) Date of Patent: *Jul. 10, 2001

(54) METHOD AND APPARATUS FOR LOGIC AND POWER ISOLATION DURING POWER MANAGEMENT

(75) Inventor: Gunjeet Baweja, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,933

(22) Filed: Feb. 12, 1997

(51) Int. Cl.$^7$ .................................................. G06F 1/32
(52) U.S. Cl. ........................................................ 713/300
(58) Field of Search .................... 395/750.01–750.08; 364/707

(56) References Cited

U.S. PATENT DOCUMENTS

| | | | |
|---|---|---|---|
| 4,586,157 | * 4/1986 | Rector et al. ................... 395/750.08 |
| 5,241,680 | * 8/1993 | Cole et al. ....................... 395/750.04 |
| 5,262,998 | 11/1993 | Mnich et al. . | |
| 5,264,808 | 11/1993 | Tanaka .............................. 331/57 |
| 5,355,342 | * 10/1994 | Ueoka .................................. 365/201 |
| 5,365,487 | 11/1994 | Patel et al. .......................... 365/226 |
| 5,388,265 | 2/1995 | Volk .................................... 713/300 |
| 5,390,350 | * 2/1995 | Chung et al. ................... 395/750.04 |
| 5,454,114 | * 9/1995 | Yach et al. ....................... 395/750.07 |
| 5,532,968 | 7/1996 | Lee ..................................... 365/222 |
| 5,533,123 | * 7/1996 | Force et al. ............................ 380/4 |
| 5,566,117 | 10/1996 | Okamura et al. ................... 365/222 |
| 5,596,545 | 1/1997 | Lin ..................................... 365/236 |
| 5,614,872 | 3/1997 | Tagiri . | |
| 5,627,477 | 5/1997 | Kuroda et al. . | |
| 5,628,020 | 5/1997 | O'Brien ............................. 395/750 |
| 5,629,897 | 5/1997 | Iwamoto et al. ................... 365/195 |
| 5,634,106 | 5/1997 | Yaezawa et al. ................... 395/433 |
| 5,648,710 | 7/1997 | Ikeda . | |
| 5,652,890 | * 7/1997 | Foster et al. ................... 395/750.05 |
| 5,680,352 | * 10/1997 | Roohparvar ....................... 365/194 |
| 5,740,454 | * 4/1998 | Kelly et al. ..................... 395/750.03 |
| 5,754,867 | 5/1998 | Walker ............................... 395/750 |
| 5,808,952 | 9/1998 | Fung et al. .......................... 365/222 |
| 5,838,929 | * 11/1998 | Tanikawa ............................ 710/102 |
| 5,881,016 | 3/1999 | Kenkare et al. . | |
| 5,940,851 | 8/1999 | Leung ................................ 711/106 |
| 5,966,045 | * 10/1999 | Asakura .............................. 327/544 |

* cited by examiner

Primary Examiner—Paul R. Myers
(74) Attorney, Agent, or Firm—Blakely, Sokoloff, Taylor & Zafman LLP

(57) ABSTRACT

A method and apparatus for power management in a computer system is provided. A first power management signal is asserted, to indicate entry into a power management mode. An internal power management signal is generated, the internal power management signal being distinct from the first power management signal. The internal power management signal signals that a primary power connection is not stable. The primary power connection to the computer system is disconnected. The computer system is in said power management mode when the primary power connection is disconnected and the internal power management signal is asserted.

25 Claims, 6 Drawing Sheets

METHOD AND APPARATUS FOR LOGIC AND POWER ISOLATION DURING POWER MANAGEMENT

FIELD OF THE INVENTION

The present invention relates to computer systems, and more specifically, to power management in a computer system.

BACKGROUND OF THE INVENTION

Today's computer systems are often mobile. Such mobile computer systems are generally powered by batteries at least some of the time. Users expect to use their mobile computer for a long time without recharging the batteries. Today's mobile computer systems extend battery life by creating more powerful batteries and/or by decreasing power consumption of the mobile computer system. One method of decreasing power consumption in a computer system is to enter a power management mode when the computer is not in use.

A power management mode is a state in which the power consumption of the computer system is decreased. One known prior art power management mode is referred to herein as "suspend." The suspend mode may refer to a number of different states in which power consumption is reduced. However, for the purposes of this application, suspend mode refers to a "deep suspend" in which power is disconnected from at least part of the computer system. The suspend mode allows the computer to "go to sleep," a state in which power consumption is significantly decreased. When the computer is "woken up" from the suspend mode, it is in the same condition as it was prior to suspend. For example, if a user is working on a word processing document when the computer goes to sleep, when the computer wakes up, it displays the same word processing document. Such information is generally stored in dynamic memory, i.e. memory which needs to be refreshed periodically. Logic that is operational during suspend mode is used to refresh the dynamic memory and exit the suspend mode. This logic is referred to herein as suspend logic. The suspend logic is only about 1–3% of the total logic on a chip. Hence, if only the suspend logic is powered, the power consumption of the chip is dramatically reduced. The logic that is not operational during the suspend mode is referred to herein as normal logic.

One prior art method of entering into a power management mode is described below. A computer system includes a processor, a mobile system controller, and a PCI I/O controller. Power management mode is initiated by asserting a suspend-state pin on the mobile system controller, SUS_STAT#. A suspend logic area is isolated, separately powered, and clocked. A PWROK pin indicates the power state of the normal logic. In one embodiment, when the PWROK pin is high, the power to the normal logic is on, and when the PWROK pin is low, the power is shut off. After entering into the suspend mode, the PWROK pin is pulled low, and then power to the normal logic is shut off. At this point, the computer system is in the power management mode, and power is isolated from most components of the computer system. However, power, via a separate power connection, is maintained to the suspend logic.

The suspend logic maintains the dynamic memory and is needed to exit from the power management mode. The suspend logic is connected to normal logic, when the computer system is in a normal mode. Thus, the inputs to the suspend logic have to be isolated from the rest of the computer system while the computer system is in the power management mode. In this way, no false inputs are input to the suspend logic. Not isolating the inputs to the suspend logic could lead to incorrect states in CMOS devices, which can result in leakage, and thus power drains. The PWROK pin is used to isolate inputs from the normal logic to the suspend logic. The state of the PWROK pin is defined to be logic low when the power is off. The inputs to the suspend logic and the PWROK pin are coupled through a logical AND function. Thus, when the PWROK pin is low, no values will be propagated into the suspend logic.

One prior art method of exiting a power management mode is initiated by asserting an external RESET pin on the mobile system controller. The SUS_STAT# pin is deasserted in response, indicating the end of the power management mode. The main power connection is reactivated. After the power supply stabilizes, the PWROK pin is driven high, to indicate that there is a stable power supply. This removes the isolation of the suspend logic from the normal logic.

The prior art methods described above require external pins, including the RESET pin, the PWROK pin, and the SUS_STAT# pin. In most computer systems having sufficient number of pins for external signals is expensive. Therefore, a method that reduces the number of external pins would be advantageous.

Therefore, what is needed is a method and apparatus to enter into and exit out of a power management mode which does not require one or more of the external pins.

BRIEF SUMMARY OF THE INVENTION

The present invention is a method and apparatus for entering and exiting a power management mode in a computer system. A first power management signal is asserted, to indicate entry into a power management mode. An internal power management signal is generated, the internal power management signal being distinct from the first power management signal. The internal power management signal is asserted, showing that a primary power connection is not stable. The primary power connection to the computer system is turned off. The computer system is in the power management mode when the primary power connection is turned off and the internal power management signal is asserted.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for power management in a mobile computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
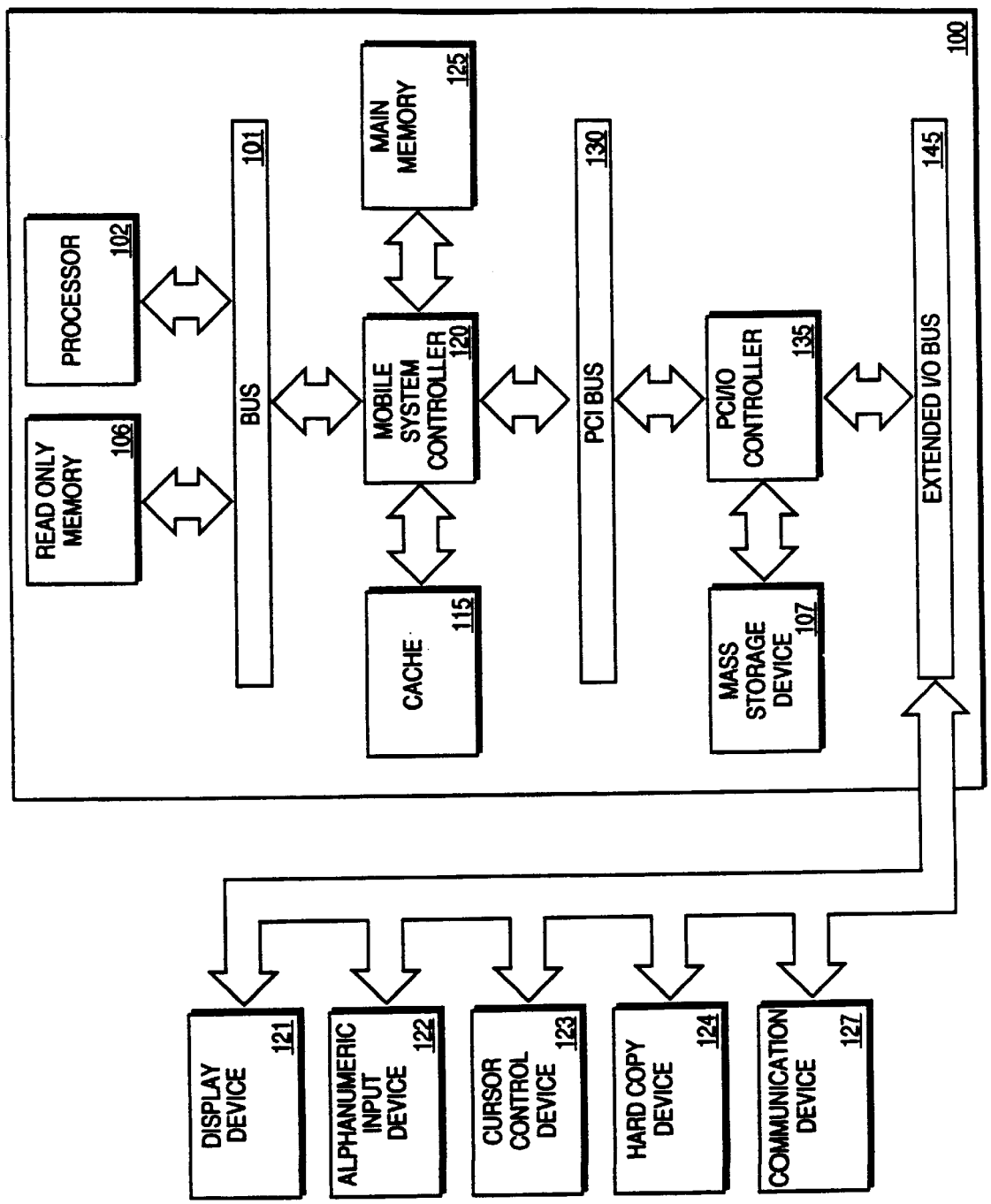
FIG. 1 is a block diagram of a computer system in which the present invention may be implemented.

FIG. 1 is a block diagram of the computer system 100 in which an embodiment of the present invention can be implemented. Computer system 100 comprises a bus 101 or other communication means for communicating information, and a processor 102 coupled with bus 101 for processing information. Computer system 100 also comprises a read only memory (ROM) and/or other static storage device 106 coupled to bus 101 for storing static information and instructions for processor 102.

The computer system 100 further comprises a main memory 125, a dynamic storage device for storing information and instructions to be executed. Main memory 125 also may be used for storing temporary variables or other intermediate information during execution of instructions. In one embodiment the main memory 125 is dynamic random access memory (DRAM). The computer system 100 also comprises a cache 115 for holding recently accessed data, designed to speed up subsequent access to the same data.

Computer system 100 further comprises a mobile system controller 120 coupled to the bus 101 to control the main memory 125 and cache 115. The mobile system controller 120 includes a cache controller, a memory controller as well as a bus controller. The mobile system controller 120 is coupled to a peripheral component interconnect (PCI) bus 130. The PCI bus 130 is for interconnecting with PCI components, which are well-known in the art have not been shown to avoid obscuring the present invention.

Computer system 100 also includes a PCI input/output (I/O) controller 135 for controlling the I/O access to the mass storage device 107. A mass storage device 107 such as a magnetic disk or optical disk and its corresponding disk drive can be coupled to the PCI I/O controller 135. The PCI I/O controller 135 may also be coupled to an extended I/O bus 145 for coupling input and output devices to the computer system 100.

The control of the computer system may be split up between a processor 102, a mobile system controller 120, and PCI I/O controller 135. In one embodiment, the mobile system controller 120 is used to control the dynamic memory 125 and cache 115 during normal operation. In one embodiment, the mobile system controller 120 also controls the computer system in power management mode. In one embodiment, the processor 102, mobile system controller 120, and PCI I/O controller 135 are separate components. Alternatively, they may be incorporated on one or more chips.

Computer system 100 can also be coupled via I/O bus 145 to a display device 121, such as a cathode ray tube (CRT), for displaying information to a computer user. An alphanumeric input device 122 is typically coupled to I/O bus 145 for communicating information and command selections to processor 102. Another type of user input device is cursor control device 123, such as a mouse, a trackball, trackpad, or cursor direction keys for communicating direction information and command selections to processor 102 and for controlling cursor movement on display device 121. Alternatively, other input devices such as a stylus or pen can be used to interact with the display. The computer system 100 can also be coupled via I/O bus 145 to a hard copy device such as a printer. The computer system 100 may further be coupled via the I/O bus 145 to a communication device 127. The communication device 127 may be a speaker or microphone, or other device to communicate between a user and a computer system 100. Alternatively, these devices may be coupled to the computer system 100 via the PCI bus 130.

The present invention is related to the power management in a computer system 100. According to one embodiment, the power management is performed by computer system 100 in response to the processor 102, the mobile system controller 120, and/or the PCI I/O controller 135 executing sequences of instructions contained in memory 125. Execution of the sequences of instructions causes the computer system 100 to enter into a power management mode, as will be described hereafter. In alternative embodiments, circuit logic internal to the computer system 100 may be used in place of or in combination with software to implement the present invention. Thus, the present invention is not limited to any specific combination of hardware and software.

Figure 2:
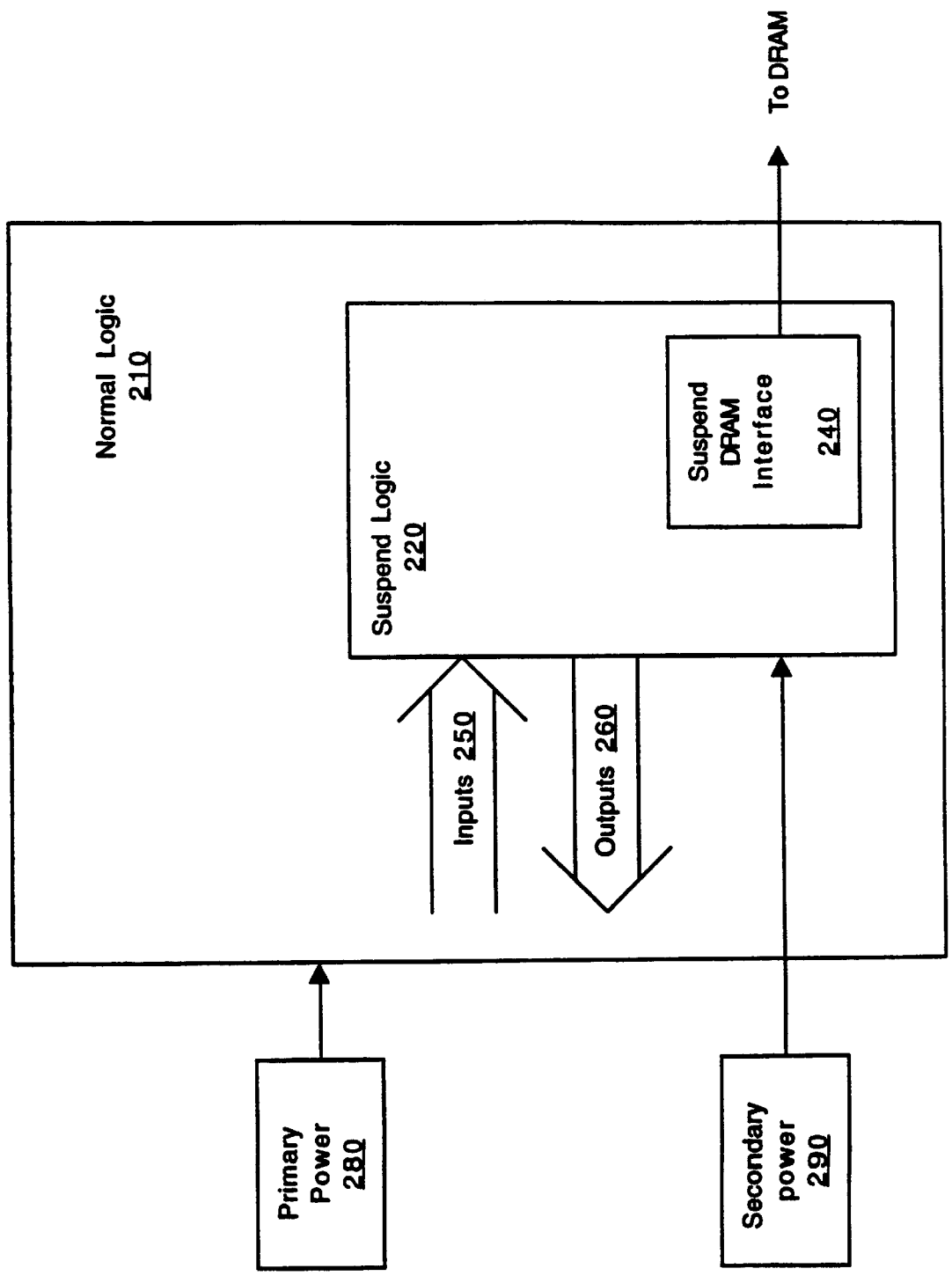
FIG. 2 is a block diagram of one embodiment of the logic blocks used in the present invention.

FIG. 2 is a block diagram of the present invention. The normal logic 210 is utilized when the computer system 100 is in the normal mode. The normal mode consist of the computer system's normal operation, which is well known in the art. The suspend logic 220 acts as a part of the normal logic 210 when the computer is in normal mode. However, the suspend logic 220 controls the computer system 100 in power management mode, and is used to refresh the memory and to exit the mobile system controller 120 from the power management mode. The suspend logic is only about 1–3% of the total logic on a chip. Hence, when only the suspend logic is powered the power consumption of the chip is dramatically reduced. The normal logic 210 and the suspend logic 220 may be in the processor 102, mobile system controller 120 and/or in the PCI I/O controller 135. However, in one embodiment the suspend logic 220 is in the mobile system controller 120.

The normal logic 210 has a primary power connection 280. The primary power connection 280 powers most of the computer system during normal operation. A secondary power connection 290 powers the suspend logic during normal operation. In power management mode, the primary power connection 280 is turned off, while the secondary power connection 290 maintains power to the suspend logic 220.

The suspend logic 220 includes a suspend DRAM interface 240. The suspend DRAM interface 240 controls generation of memory refresh cycles during the suspend mode. It is part of the normal DRAM interface, which is used in normal mode. In one embodiment, the suspend DRAM interface 240 is designed to include the least logic needed to refresh the DRAM. The suspend logic 220 is powered during the power management mode in order to refresh the DRAM in the computer system 100. and exit the power management mode.

FIG. 2 also shows the inputs 250 to the suspend logic 220. The inputs 250 to the suspend logic 220 are coupled to the normal logic 210 in the normal mode. However, during power management mode, the normal logic 210 is not powered. When logic is not powered, it may float or display invalid information. It may also cause some circuits to short circuit, leading to leakage and causing a power drain. Therefore, the coupling between the normal logic 210 and the suspend logic 220 is severed when the computer is in a power management mode. By isolating the inputs 250 of the suspend logic 220 when the computer system is in a power management mode, invalid inputs and the resulting power drain are avoided. The outputs 260 of the suspend logic 220 are also isolated when the computer system 100 is in power management mode. If the outputs 260 of the suspend logic 220 are not isolated, they may result in the normal logic 210 being in an invalid state. In this state some circuits may form short circuits, leading to leakage, causing a power drain. Therefore, the outputs 260 of the suspend logic 220 are isolated in power management mode. In one embodiment, an internally generated signal, the IN_SUSPEND# signal, is used to indicate that the primary power connection 280 to the normal logic 210 is being shut off, so that the inputs 250 and outputs 260 of the suspend logic 220 can be isolated. The generation of the IN_SUSPEND# signal is discussed below.

Figure 3:
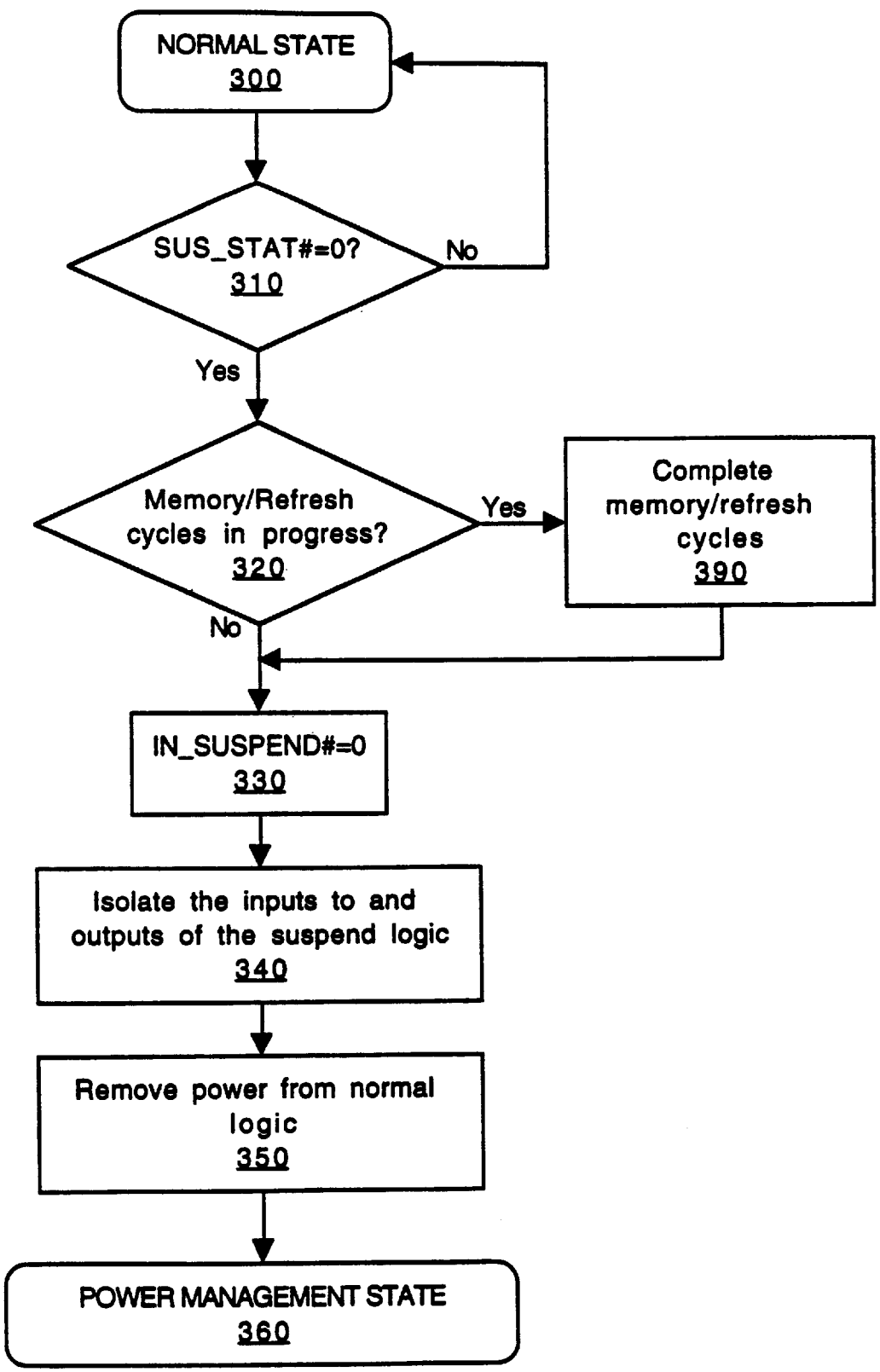
FIG. 3 is a flowchart illustrating the entry of the computer system into a power management mode.
Figure 6:
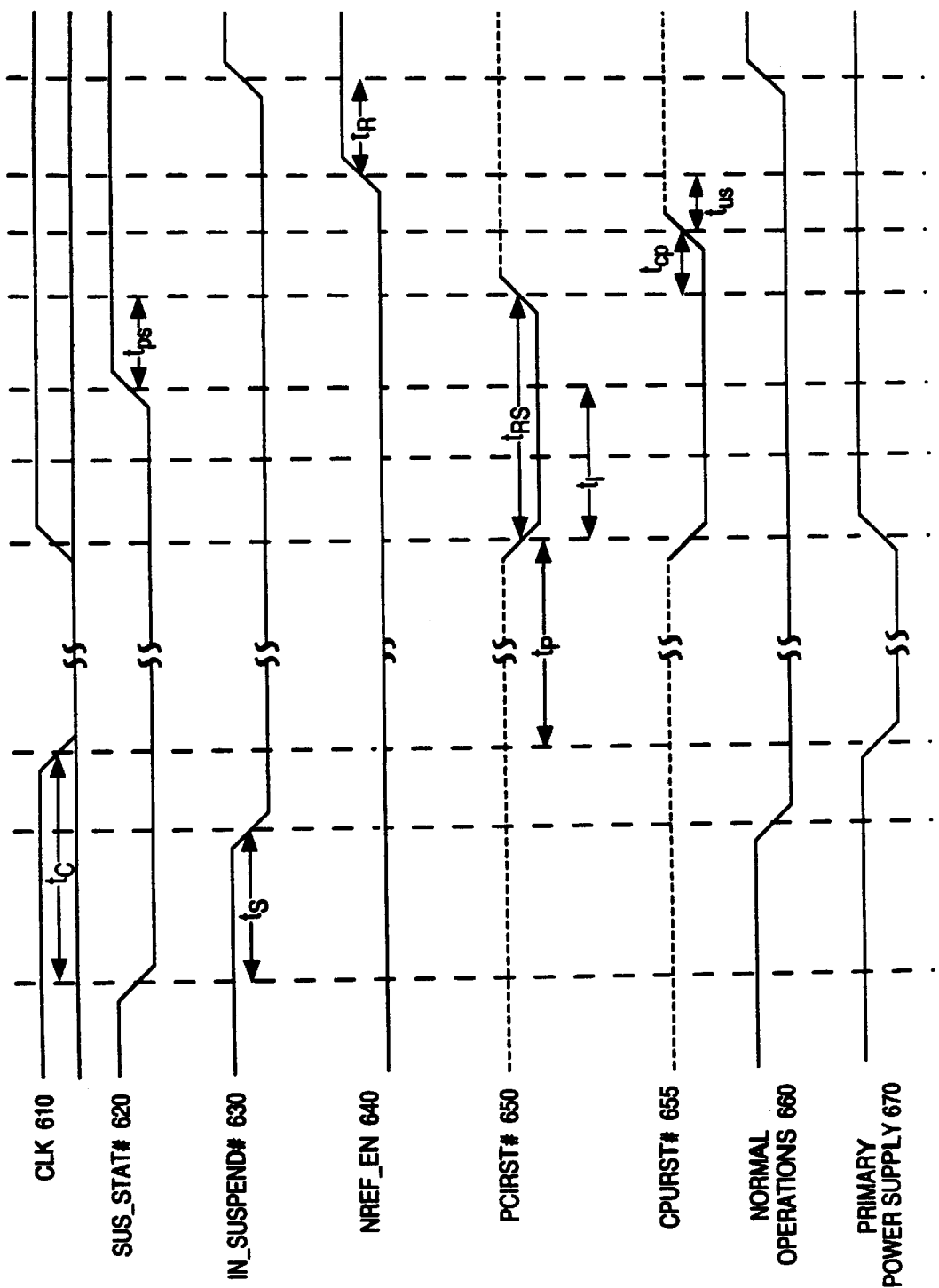
FIG. 6 is a timing wave form diagram showing the signals used by the present invention.

FIG. 3 is a flowchart of the entry of the computer system into a power management mode. The time relationships between the various signals are illustrated in FIG. 6.

Returning to FIG. 3, at block 300, the computer is in a normal mode. The normal mode is when the computer system 100 is operating normally, and the primary power connection 280 is powering the normal logic 210. The suspend logic 220 is operating as part of the normal logic 210. At block 310, the state of the SUS_STAT# pin is examined. The SUS_STAT# pin is an external pin indicating entry into the power management mode. In one embodiment, the SUS_STAT# pin is an active low pin. In one embodiment, the SUS_STAT# pin is asserted by the PCI I/O controller 135. It is to be understood that although reference is made to pins being active high or active low, changing pins from active low to active high is within the scope of this invention.

Entry into the power management mode may be a result of one of a number of events. In one embodiment, if the computer system is idle for a predetermined period of time, it is automatically placed into a power management mode. In one embodiment, the user can directly initiate a power management mode by either selecting it from a menu or pressing keys or controls. Triggers for entry into a power management mode are known in the art. When the power management mode is initiated, the SUS_STAT# pin is pulled low. If the SUS_STAT# pin is not low, the process returns to the normal mode, at block 300. If the SUS_STAT# pin is low, a power management mode has been initiated, and the process continues at block 320.

At block 320, the process tests whether there are any memory refresh cycles in progress. The computer memory is generally a dynamic memory because dynamic memory is dense, and relatively cheap. Such dynamic memory needs to be refreshed periodically, in both normal and power management mode. Missing a memory refresh cycle may result in memory loss. Therefore the entry into the power management mode is designed not to disturb pending memory refresh cycles. Thus, the system tests whether the computer system is executing a memory refresh cycle, at block 320. If a memory refresh cycle is in progress, the process waits for the memory refresh cycle to be completed, at block 390, and then continues to block 330. If no memory refresh cycles are in progress, process continues directly to block 330.

At block 330, an internal suspend signal, IN_SUSPEND#, is asserted. The IN_SUSPEND# signal indicates that the primary power supply is not stable. The generation of the IN_SUSPEND# signal is discussed in more detail with respect to FIG. 5. Using preset timing relationships, as described with respect to FIG. 6, the IN_SUSPEND# signal replaces an external pin indicator.

Returning to FIG. 3, at block 340, the inputs 250 and outputs 260 of the suspend logic 220 are isolated. As discussed above, the inputs 250 and outputs 260 of the suspend logic 220 are isolated from normal logic 210 in power management mode. In one embodiment, the inputs 250 and outputs 260 are isolated using the functionality of a logical AND. Each input signal of the inputs 250 is logically AND-ed with the IN_SUSPEND# signal, and this AND-ed input signal is coupled to the suspend logic. The outputs 260 are similarly AND-ed with the IN_SUSPEND# signal. Since the IN_SUSPEND# signal is an active low signal, it is a zero when the computer system is in the power management mode. Thus, the output of the logical AND is a zero when the computer system is in a power management mode. Alternatively, the IN_SUSPEND# signal may be used with a latch or multiplexer to isolate the inputs and outputs. Other methods of isolation are known in the art.

At block 350 the primary power connection 280 is isolated from the normal logic 210. The primary power connection 280 is isolated after a predetermined period of time elapses after the assertion of the SUS_STAT# pin. Defining this time relationship, as will be further discussed with respect to FIG. 6, assures that the memory refresh cycles and isolation steps take place before the primary power connection 280 is removed from the normal logic. When the primary power connection 280 is isolated, only the suspend logic 220 is powered by the secondary power connection 290.

At block 360 the computer system is in a power management mode. The inputs 250 and outputs 260 of the suspend logic 220 are isolated from the normal logic 210, and only the suspend logic 220 is powered. Generally, the computer system can not be used for computing functions in this state. However, the computer system maintains its state in memory, and thus can return to it after the exit from the power management mode.

Figure 4:
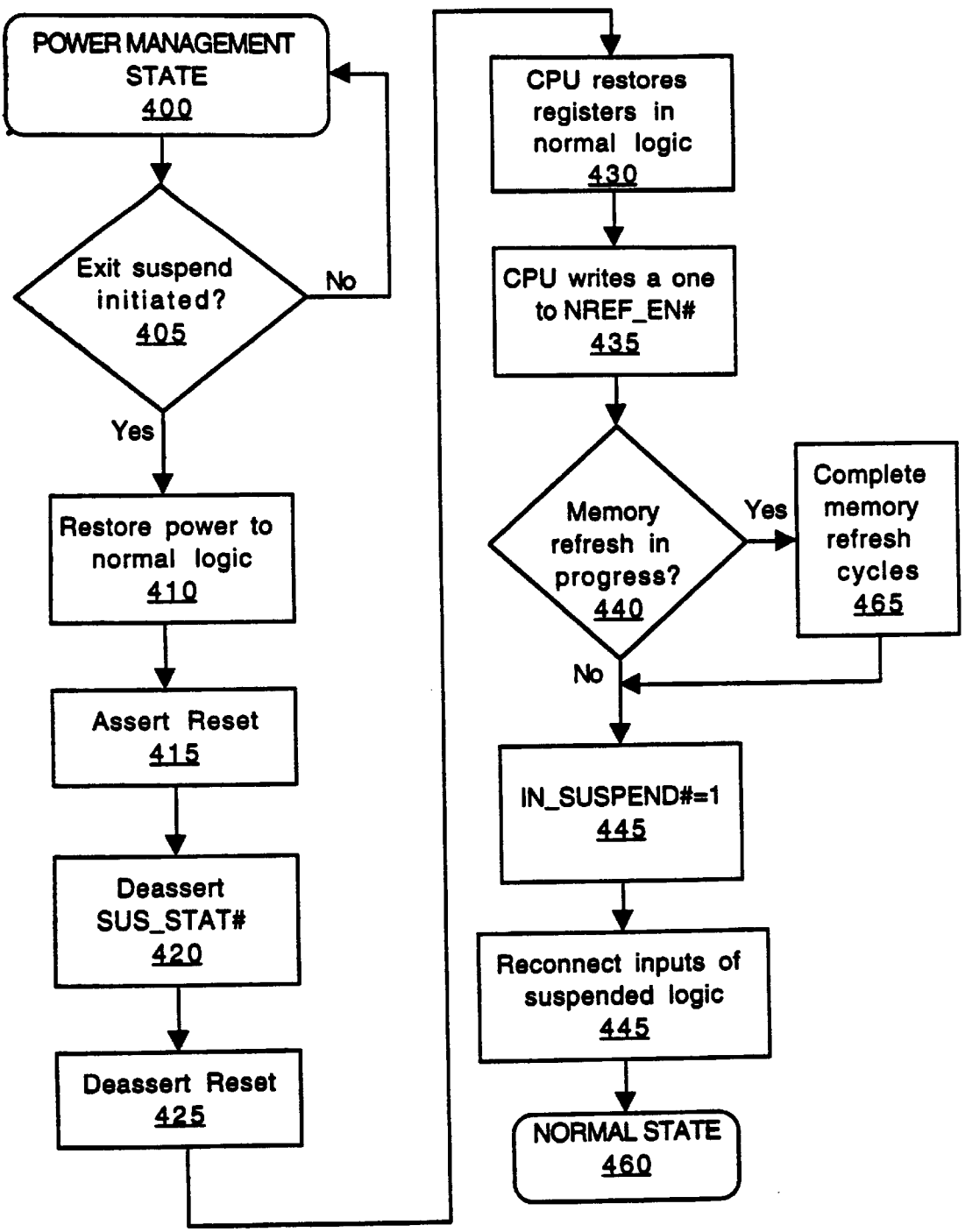
FIG. 4 is a flowchart illustrating the exit of the computer system from a power management mode.

FIG. 4 is a flowchart of the exit of the computer system from a power management mode. The time relationships between the various signals are illustrated in FIG. 6.

Returning to FIG. 4, at block 400 the computer is in a power management mode. As described above, the power management mode comprises a primary power connection 280 isolated, a secondary power connection 290 providing power only to a suspend logic 220, and inputs 250 and outputs 260 of the suspend logic 220 isolated.

At block 405, the system tests whether an exit from the power management mode has been initiated. A variety of events can trigger the exit from the power management mode. For example, a user can press a key on the keyboard, or otherwise indicate that he or she wishes to utilize the computer. If an exit was initiated, the process continues at block 410, otherwise, process returns to block 400.

At block 410 the primary power connection 280 is restored to the normal logic 210. The normal logic 210 is isolated, and not powered, during power management mode. The first step of waking up the computer system is restoring the primary power connection 280 to the normal logic 210.

At block 415, reset is asserted. The reset may include one or both of a reset for the mobile system controller, PCIRST#, and a reset for the CPU, CPURST#. The PCIRST# pin resets the mobile system controller 120, and sets register bits to their default value. In one embodiment, during the power management mode, the CPU is not powered. In this embodiment, the CPU needs to be reset as well, using the CPURST# signal. Resets are used because the value of logic that is not powered can float and end with invalid values.

Therefore, to be sure that no invalid values remain in any registers, any registers which were not powered during the power management mode are reset to default values.

At block 420, the SUS_STAT# pin is deasserted. As discussed above the SUS_STAT# pin is the external pin indicator that the computer system is in a power management mode. At block 425, the resets are deasserted. Before the computer system can complete the exit from the power management system, the resets are deasserted.

At block 430, the CPU restores the contents of registers to the values held prior to the power management mode. Because during the power management mode power was removed from the normal logic 210, contents of registers in the normal logic 210 are not maintained. The contents of such registers are maintained in the dynamic memory during the power management mode. Alternative methods of maintaining the contents of registers are known in the art.

At block 435, the CPU writes to the NREF_EN register, asserting it. The NREF_EN register is an internal register controlled by the processor. The NREF_EN register is asserted to indicate that the registers have been restored to their pre-power management mode state.

At block 440, the system tests whether there is a pending memory refresh cycle. If there is no pending memory refresh cycle, process continues directly to block 445. If there is a pending memory refresh cycle, the computer system allows the pending memory refresh cycle to be completed, at block 465. The process then continues to block 445.

At block 445, the IN_SUSPEND# signal is deasserted. At this point the normal logic 210 is powered, and the registers have been restored. Therefore, the normal logic 210 is fully operational, and the IN_SUSPEND# signal can be deasserted. The deassertion of the IN_SUSPEND# signal results in the IN_SUSPEND# signal going high. Since the inputs 250 and outputs 260 of the suspend logic 220 were isolated via a logical AND with the IN_SUSPEND# signal, this results in the ending of the isolation of the inputs 250 and outputs 260. Thus, at block 450, the inputs 250 and outputs 260 of the suspend logic 220 are recoupled with the normal logic 210.

At block 460, the computer system is in the normal mode. In the normal mode the suspend logic 220 acts as part of the normal logic 210. The computer system is restored to substantially the identical state as before entering the power management mode. Therefore, a user can continue with the same activity as prior to entering the power management mode. For example, if the user was editing a word-processing document prior to entry into the power management mode, upon exiting the power management mode, the user would find the same document with the cursor in the same position.

Figure 5:
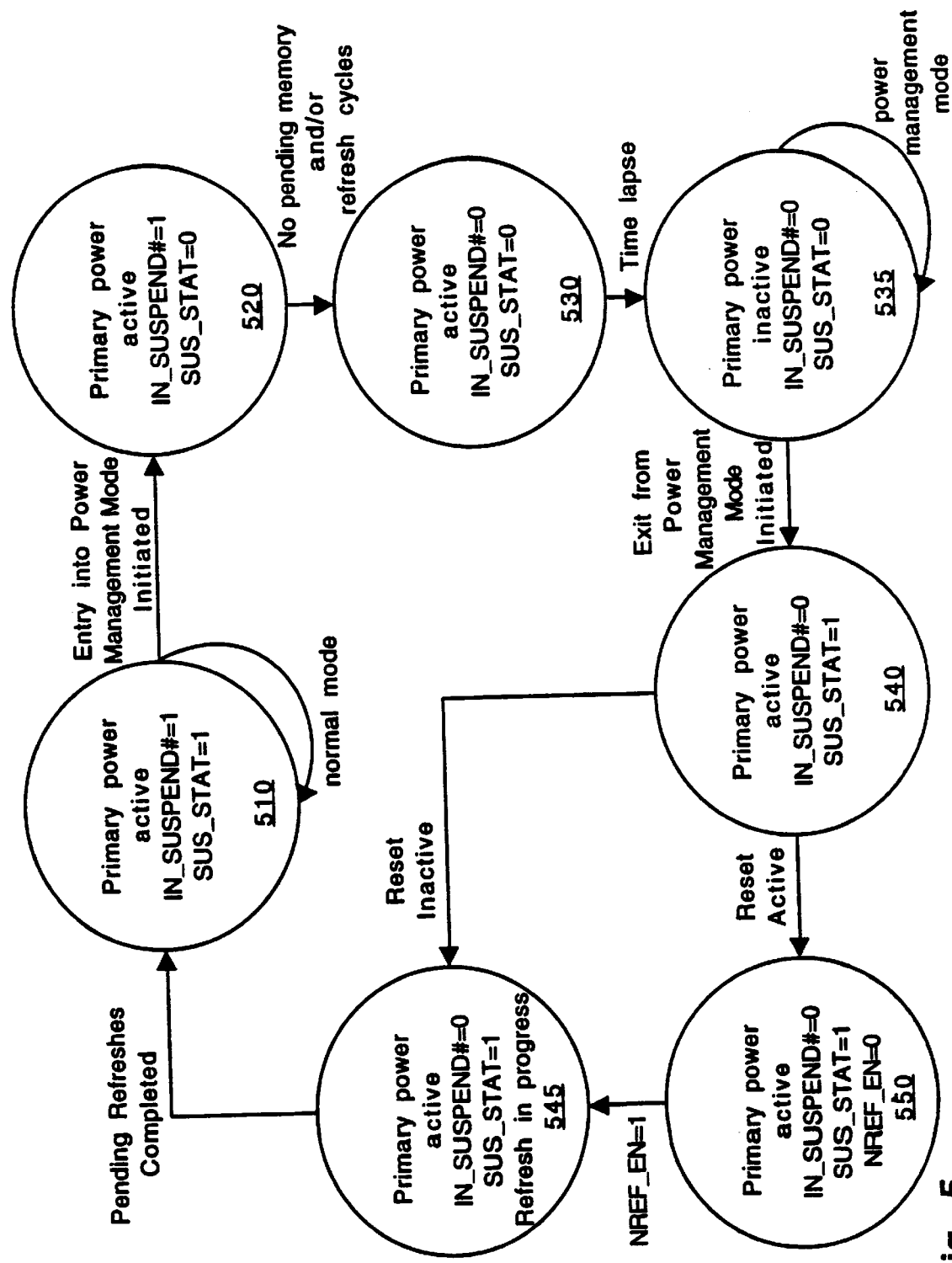
FIG. 5 is a state diagram of one embodiment of the generation the internal suspend signal IN_SUSPEND#.

FIG. 5 is a state diagram of the IN_SUSPEND# signal generation. The IN_SUSPEND# signal is an internal signal which replaces the external PWROK pin, and is used to indicate that the computer system 100 does not have a stable power supply. The IN_SUSPEND# signal is also used to isolate the inputs 250 and outputs 260 of the suspend logic 220, while the computer system 100 is in the power management mode.

Returning to FIG. 5, at node 510, the primary power connection 280 is active, the IN_SUSPEND# signal is high, and the SUS_STAT# signal is high. Therefore, since the IN_SUSPEND# signal and the SUS_STAT# signal are both active low signals, this indicates that they are not asserted. This is the normal operation. If nothing occurs at this stage, normal operation can continue indefinitely. The initiation of the entry into the power management mode is the transition to node 520.

At node 520, the primary power connection 280 is still active. The IN_SUSPEND# signal is still high. However, the SUS_STAT# signal is low, or asserted. This is an intermediate state. The completion of any pending memory refresh cycles is the transition to node 530.

At node 530, the primary power connection 280 is active. The IN_SUSPEND# signal and the SUS_STAT# signal are asserted. Once the inputs 250 and outputs 260 have been isolated by the assertion of the IN_SUSPEND# signal, the primary power connection 280 can be shut off. A predetermined time elapses between the assertion of the SUS_STAT# signal and isolation of the primary power connection 280, in order to guarantee that the inputs 250 and outputs 260 are isolated before the transition. This time lapse is the transition from node 530 to node 535.

At node 535, the primary power connection is inactive, and the IN_SUSPEND# and SUS_STAT# signals are asserted. This state is the power management mode. The computer system can remain in this state for a long time and consume very little power, maximizing battery life. The initiation of the exit from the power management mode is the transition to node 540.

At node 540, the primary power connection is still inactive, and the IN_SUSPEND# signal is still asserted. The SUS_STAT# signal has been deasserted. The computer system is in the midst of the transition out of the power management mode at node 540. If the RESET signal is inactive, the computer proceeds directly to node 545. If, the RESET signal is active, the computer transitions to node 550. The system waits at node 550 until NREF_EN register has been written to, before the transition to node 545. At node 545, the system tests whether there are any pending memory refresh cycles. Completion of pending memory refresh cycles is the transition to node 510. At node 510, the computer system is once again operating normally.

FIG. 6 is a timing wave form diagram of the signals used in the present invention. The clock signal, CLK 610, indicates that the primary clock is active. In one embodiment, the primary clock has a frequency of 66 MHz.

The suspend pin, SUS_STAT# 620, initiates entry to, and exit from, a power management mode. In one embodiment, this pin is active low, and an external pin of the mobile system controller 120. In one embodiment, the pin is asserted and deasserted by the PCI I/O controller 135.

The internal suspend signal, IN_SUSPEND# 630, is an internal indicator signal which indicates that the computer system does not have a stable power supply and is in a power management mode. The internal reference enable register, NREF_EN 640, is a register that is written to by the processor 102 when the registers have been restored to their pre-power management mode state.

The PCI reset signal, PCIRST# 650, is an external pin indicator which initiates the reset of the mobile system controller 120. In one embodiment, the PCIRST# signal 650 is triggered by the PCI I/O controller 135. The PCIRST# signal 650 is used to restore the registers. Because the registers in the normal logic are not maintained during the power management mode, they may contain invalid values, which are corrected. The PCIRST# signal 650 initiates this process.

The CPU reset signal, CPURST# 655, is an external pin which initiates the processor 102. The power management mode may include removing power from the CPU. In such cases, the CPU needs to be reset as well. The CPURST# signal 655 is used in order to restore the registers. Because the registers in the CPU are not maintained during the power management mode they may contain invalid values, which are corrected. The CPURST# signal 655 initiates this process.

The normal operations signal 660 indicates whether the computer system is in a normal mode or a power management mode. When the normal operations signal 660 is high, the computer system is in a normal mode. When the normal operations signal 660 is low, the computer system is either in a power management mode, or in transition between states. The primary power signal 670 indicates when the primary power is on. When this signal 670 is low, the primary power is switched off.

The period between the assertion of the SUS_STAT# signal 620 and the turning off of the CLK signal 610 and primary power supply signal 670 is designated $t_c$. The period $t_c$ has to be sufficiently long to allow completion of pending memory refresh cycles. In one embodiment, the period $t_c$ is fixed at 32 µs. Presetting the period tc permits the elimination of the external PWROK pin. By setting the period $t_c$ to a value which is greater than the maximum period needed to enter into the power management mode, it is guaranteed that the signals can be isolated prior to the primary power supply and clock being shut off.

The period between the assertion of the SUS_STAT# signal 620 and the assertion of the IN_SUSPEND# signal 630 is designated $t_s$. The period $t_s$ has to be shorter than the period $t_c$. The IN_SUSPEND# signal is asserted before the CLK signal 610 and the primary power supply signal 670 are turned off. When the CLK signal 610 and the primary power supply signal 670 are zero, the computer is in a power management mode. After the computer system has entered the power management mode, it is in that mode for a period of time designated $t_p$. The period $t_p$ can range from a few seconds to several hours, or more. It is limited only by the battery power of the computer.

When the computer system is in transition from power management mode to normal operation, the CLK signal 610, primary power supply signal 670 and the PCIRST# signal 650 are asserted. In one embodiment, the PCIRST# signal 650 is asserted concurrently with the CLK signal 610. The CPURST# signal 655 is asserted if the power management mode turned off power to the CPU. In one embodiment, the CPURST# signal 655 is asserted concurrently with the PCIRST# signal 650.

While the PCIRST# signal 650 is still low, the SUS_STAT# signal 620 is deasserted. The time between the assertion of the PCIRST# signal 650 and the deassertion of the SUS_STAT# signal 620 is $t_f$. The period $t_f$ has to be sufficiently long for the power supply to stabilize. In one embodiment the period $t_f$ is 1 ms. The IN_SUSPEND# signal 630 remains asserted during this time, isolating the suspend logic during power-up, and preventing leakage.

The SUS_STAT# signal 620 is deasserted $t_{ps}$ before the deassertion of the PCIRST# signal 650. The period $t_{ps}$ has to be sufficiently long for the state machine to determine if the reset signal was active or inactive when the SUS_STAT# signal was asserted. This time is needed to transition from node 540 to node 545, as shown in FIG. 5 above. In one embodiment, the period $t_{ps}$ is 32 µs. The CPURST# signal 655 is deasserted $t_{cp}$ after the deassertion of the PCIRST# signal 650. This time is based on the CPU specifications. In one embodiment, $t_{cp}$ is 32 µs. The NREF_EN register is written to $t_{us}$ after CPURST# is activated. The period $t_{us}$ has to be sufficiently long to restore the contents of the configuration registers. The period $t_{us}$ is BIOS dependent.

Next, the IN_SUSPEND# signal 630 is deasserted. The period of time between when the NREF_EN register 640 is written to and the deassertion of the IN_SUSPEND# signal 630 is $t_R$. The period $t_R$ has to be sufficiently long to finish pending memory refresh cycles. In one embodiment, the period $t_R$ is greater than 15 µs. In one embodiment, the period $t_R$ is less than 32 µs. Presetting the period $t_R$ to a value greater than the maximum time needed to complete any pending memory refresh cycles allows the computer to switch from a power management mode to a normal mode without the loss of any information in the memory. When the IN_SUSPEND# signal 630 is deasserted, the computer system has been returned to the normal mode. At this point, the power and the registers have been restored, and the transition from suspend to normal mode can occur.

In the foregoing specification, the invention has been described with reference to specific embodiments thereof. It will, however, be evident that various modifications and changes may be made thereto without departing from the broader spirit and scope of the invention. For example, signals that are indicated as being active low could be active high. The specification and drawings are, accordingly, to be regarded in an illustrative rather than a restrictive sense. The present invention should not be construed as limited by such embodiments and examples, but rather construed according to the following claims.

What is claimed is:

1. A method of lowering power consumption in a computer system operating in a normal mode, said method comprising:

asserting a first power management signal for entering a chip including a memory controller into a power management mode;

based on a timing from the first power management signal, digitally generating a power management signal internal to the chip, said internal power management signal being distinct from said first power management signal, said internal power management signal indicating that a primary power connection to the chip is not stable; and isolating the primary power connection from the chip in response to said internal power management signal, causing said computer system including the memory controller to be in the power management mode.

2. The method of claim 1 wherein said step of asserting said internal power management signal further comprises:

refreshing a memory, if a memory refresh cycle is pending; and waiting for a period of time to elapse after the assertion of said first power management signal, prior to isolating the primary power connection.

3. The method of claim 2 further comprising:

maintaining a secondary power connection to a select logic block in said chip; and isolating an input and an of output of said select logic block in said computer system.

4. The method of claim 3 wherein said internal power management signal is a active low signal, and said step of isolating comprises utilizing a logical AND function, said internal power management signal coupled to one input of said logical AND function.

5. The method of claim 1 wherein said step of isolating said primary power connection comprises:

maintaining a secondary power connection to a selected part of said computer system; and isolating said primary power connection from said computer system.

6. The method of claim 1 wherein isolating said primary power connection comprises:

maintaining a secondary power connection to a suspend logic block in said computer system, said suspend logic block controlling said computer system when said computer system is in said power management mode; and isolating said primary power connection from said computer system.

7. The method of claim 6 further comprising:

isolating a plurality of inputs of said suspend logic block from said computer system; and isolating a plurality of outputs of said logic area from said computer system.

8. The method of claim 1, wherein there is a period of time between the assertion of the first power management signal and the generation of the internal power management signal, the period of time being preset to a time sufficiently long to complete all pending memory refresh cycles.

9. The method of claim 1, wherein the first power management signal is asserted a preset period of time prior to a primary power supply signal being turned off.

10. The method of claim 9, wherein the internal power management signal is generated prior to an end of the preset period of time.

11. A method of power management in a computer system having a primary processor and a mobile system controller, comprising:

asserting a first signal, said first signal indicating that said computer system is passing from a normal mode to a power management mode;

maintaining a secondary power connection to a suspend logic block in said mobile system controller;

based on a timing from the first signal, digitally generating an internal power management signal distinct from said first signal in the mobile system controller, said internal power management signal indicating that a primary power connection is not stable; and isolating said primary power connection from said computer system.

12. The method of claim 11, further comprising completing a pending memory refresh cycle before asserting said internal power management signal.

13. The method of claim 11 wherein generating said internal power management signal further comprises:

isolating a plurality of inputs of said suspend logic block from said computer system; and isolating a plurality of outputs of said logic area from said computer system.

14. The method of claim 13 wherein said internal power management signal is a active low signal, and said step of isolating further comprises utilizing a logical AND function, said internal power management signal coupled to one input said logical AND function.

15. The method of claim 11 wherein asserting said internal power management signal further comprises:

refreshing a memory, if a memory refresh cycle is pending; and waiting for a period of time to elapse after the assertion of said first power management signal.

16. The method of claim 11, wherein the primary power connection is turned off during a power management mode, and wherein the first signal is asserted a preset period of time prior to the primary power connection being turned off.

17. The method of claim 16, wherein the internal power management signal is generated prior to an end of the preset period of time, such that the primary power connection is isolated by the internal power management signal, prior to the primary power connection being turned off.

18. An apparatus for decreasing power consumption in a computer system comprising:

a first signal coupled to an integrated circuit in the computer system, said first signal indicating entry into a power management mode;

a primary power connection powering said computer system;

an internal signal distinct from said first power management signal, the internal signal digitally generated within the integrated circuit based on a timing derived from the first signal, the internal signal indicating that said primary power connection is not stable and causing said computer system to be in said power management mode.

19. The apparatus of claim 18 wherein said internal signal is generated by said computer system, wherein after said first signal is asserted, a preset period of time elapses before said internal signal is generated.

20. The apparatus of claim 18 further comprising:

a secondary power connection, said secondary power connection being connected to a suspend logic block in said computer system, said secondary power connection maintaining power to said suspend logic block when said primary power connection is isolated from said computer system.

21. The apparatus of claim 18 further comprising:

a normal logic block, said normal logic block operating when said computer system is not in said power management mode; and a suspend logic block, said suspend logic block operating when said computer system is in said power management mode.

22. The apparatus of claim 21 further comprising a secondary power connection connected to said suspend logic block and providing power to said suspend logic block while said computer system is in said power management mode.

23. The apparatus of claim 22 wherein said internal signal isolates a plurality of inputs and a plurality of outputs of said suspend logic block from said computer system, while said computer system is in a power management mode.

24. The apparatus of claim 23 wherein said internal signal is an active low signal, said apparatus further comprising a functional equivalent of a logical AND function, said internal signal being coupled to one of the inputs of said logical AND function, and said logical AND function utilized to isolate said plurality of inputs and outputs.

25. The apparatus of claim 18, wherein the primary power connection is turned off in the power management mode, and wherein the first signal is asserted a preset period of time prior to the primary power connection being turned off, such that the internal power management signal is generated prior to an end of the preset period, such that the primary power connection is isolated by the internal power management signal, prior to the primary power connection being turned off.

* * * * *